US008678166B2

(12) United States Patent
Borgmann et al.

(10) Patent No.: US 8,678,166 B2
(45) Date of Patent: Mar. 25, 2014

(54) ARTICULATED DISCHARGE END FOR CONVEYOR (75) Inventors: Rainer Borgmann, Blackfoot, ID (US); James Yearsley, Blackfoot, ID (US)

(73) Assignee: Spudnik Equipment Company LLC, Blackfoot, ID (US)

( * ) Notice: Subject to any disclaimer, the term of this patent is extended or adjusted under 35 U.S.C. 154(b) by 139 days.

(21) Appl. No.: 13/351,140

(22) Filed: Jan. 16, 2012

(65) Prior Publication Data
US 2013/0180832 A1   Jul. 18, 2013

(51) Int. Cl.
*B65G 65/02*   (2006.01)

(52) U.S. Cl.
USPC ............................ 198/303; 198/317; 198/318

(58) Field of Classification Search
USPC ............ 198/300, 303, 311, 317, 318; 299/56, 299/65
See application file for complete search history.

(56) References Cited

U.S. PATENT DOCUMENTS

| | | | | |
|---|---|---|---|---|
| 2,948,552 | A * | 8/1960 | Moon | 198/303 |
| 3,231,064 | A * | 1/1966 | Towles | 198/304 |
| 3,279,584 | A * | 10/1966 | Towles | 198/303 |
| 3,621,983 | A * | 11/1971 | Arentzen et al. | 198/313 |
| 4,951,801 | A | 8/1990 | Mraz | |
| 5,090,549 | A | 2/1992 | Thiel | |
| 5,819,950 | A | 10/1998 | McCloskey | |
| 6,073,745 | A * | 6/2000 | Cox | 198/303 |
| 6,688,450 | B2 * | 2/2004 | Speers et al. | 198/312 |
| 7,191,888 | B2 | 3/2007 | Kahrger et al. | |
| 7,584,834 | B2 | 9/2009 | Wood | |
| 7,641,043 | B2 | 1/2010 | Vestergaard | |
| RE42,969 | E | 11/2011 | McCloskey | |
| 8,322,507 | B2 * | 12/2012 | DeMong et al. | 198/301 |
| 2002/0092578 | A1 | 7/2002 | Tanaka | |

* cited by examiner

*Primary Examiner* — James R Bidwell
(74) *Attorney, Agent, or Firm* — Parsons Behle & Latimer (57) ABSTRACT An articulated discharge end for a conveyor that is positionable adjacent to a moveable receiver includes a frame, having a distal end, configured to bear a discharge end of a conveyor belt at the distal end. The frame has two axes of rotation, whereby the distal end is vertically translatable and laterally rotatable. A guide is disposed near the distal end, and is configured to contact the moveable receiver, whereby motion of the moveable receiver can substantially govern vertical translation and lateral rotation of the distal end.

20 Claims, 10 Drawing Sheets

ARTICULATED DISCHARGE END FOR CONVEYOR

BACKGROUND

1. Field of the Invention

The present invention relates generally to devices for conveying bulk products, such as farm produce. More particularly, the present invention relates to an articulated discharge end for a conveyor that minimizes and stabilizes the drop distance of bulk products off the discharge end.

2. Related Art

Filers are used to move and pile products that are stored in bulk. They typically have an elevating conveyor (elevator) that feeds or drops product into a piling conveyor (boom). The discharge area of the elevator is sometimes referred to as the "tip-down," and can include a downwardly oriented section of the conveyor belt upon which the product is directed toward a hopper at the supply end of the boom.

To facilitate piling products, the boom can move up and down and side-to-side. In the process of discharging product from the elevator into the hopper, the product drops some distance from the discharge end to the hopper, and this distance can vary depending on the orientation of the boom. For some products, such as potatoes or other agricultural produce, a greater drop distance can lead to bruising or other undesirable effects. Consequently, it is desirable to minimize the drop distance for many types of products when transferring from one conveyor to another.

Typical discharge ends for elevators and the like are either fixed in their position, or have a mechanical up and down adjustment that allows them to be moved and fixed in various desired positions, but does not allow adjustment during operation. However, the boom can pivot up and down and swing side-to-side while piling product in storage or on the ground. As the boom moves during the piling process the drop from the discharge end to the hopper can change constantly, which increases the chance of damaging the product. Furthermore, when the boom swings to one side, this can result in a drop distance that varies from side-to-side across the discharge end, depending on the combination of vertical and horizontal angles of the boom.

SUMMARY

It has been recognized that it would be advantageous to develop a discharge end for a conveyor that minimizes the drop distance of product therefrom.

It has also been recognized that it would be advantageous to have a conveyor discharge end that can keep a relatively constant drop distance with changing angular orientation of an adjacent conveyor boom or inlet.

In accordance with one embodiment thereof, the present invention provides an articulated discharge end for a conveyor that is positionable adjacent to a moveable receiver. The articulated discharge end includes a frame, having a distal end, configured to bear a discharge end of a conveyor belt at the distal end. The frame has two axes of rotation, whereby the distal end is vertically translatable and laterally rotatable. A guide is disposed near the distal end, and is configured to contact the moveable receiver, whereby motion of the moveable receiver can substantially govern vertical translation and lateral rotation of the distal end.

In accordance with another embodiment thereof, the invention provides an articulated discharge end for an elevating conveyor having a continuous conveyor belt. The articulated discharge end includes a frame, having a distal end bearing a discharge end of the conveyor belt. The frame includes a transverse pivot member, about which the frame can pivot to move the distal end vertically, and a longitudinal pivot member, extending substantially perpendicularly from the transverse pivot member toward the distal end. A plurality of independently moveable transverse frame sections are pivotally attached transversely in series along the longitudinal pivot member. Pivoting of the transverse frame sections causes the distal end to rotate laterally. A guide extends from the frame, and is configured to contact a moveable receiver of a conveyor system, whereby motion of the moveable receiver substantially governs vertical motion and lateral rotation of the distal end.

In accordance with yet another embodiment thereof, the invention provides a conveyor system, including a boom conveyor, configured to pivot about two axes and having a receiving hopper with an upper surface, and an elevating conveyor, having a conveyor belt with a discharge end generally above the receiving hopper. The elevating conveyor includes an articulating frame at the discharge end of the elevating conveyor, the articulating frame including a plurality of moveable frame members, having two axes of rotation, whereby the discharge end is vertically moveable and axially twistable. The frame further includes a guide that is configured to contact the moveable receiver, whereby motion of the discharge end about the two axes is substantially governed by motion of the receiving hopper.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Conveyors are often used in transporting, piling and storing products, such as agricultural products including potatoes, sugar beets, peanuts, etc. In these operations, multiple conveyors are often used in series, and the product often drops from one conveyor to another. In such situations it is desirable to minimize the drop distance of the product in order to reduce bruising and other damage to the product. Unfortunately, where a first conveyor is fixed and a subsequent conveyor or other device receiving the product is moveable, the drop distance can vary depending on the motion of the receiving device.

One situation where a substantially fixed conveyor discharges product into a moveable receiver frequently occurs when using a piler for piling products for storage. The discharge end of an elevating conveyor, or elevator, is frequently fixed with respect to the intake hopper of a piler or boom conveyor. However, the boom conveyor has the ability to pivot up and down and swing side-to-side for piling product in storage or on the ground. As the boom moves during the piling process, the drop from the discharge end of the elevator to the hopper can constantly change, which increases the chance of bruising the product.

Advantageously, an articulated or "floating" discharge end for a conveyor has been developed that minimizes the drop between the discharge end of one conveyor and a moveable receiving device, such as an intake end of another conveyor. The articulated discharge end, also referred to as a "tip-down," helps keep a substantially constant height or drop between the end of the first conveyor and the receiving device. In one embodiment, it can be very useful at the discharge end of an elevator, adjacent to the intake hopper of a boom conveyor or piler, throughout a wide range of motion of the boom. This helps to minimize the bruising that can be caused to bruise-susceptible products, such as potatoes, when they are dropped from one conveyor to another. It is to be understood, however, that the articulated discharge device disclosed herein is not limited to use with piler systems and elevating conveyors, but can be used with a wide variety of other conveyor systems.

Shown in FIGS. 1-6 are various views of one embodiment of an articulated discharge end, or tip-down 10, for a conveyor in accordance with the present disclosure. As shown in the operational views of FIGS. 7-9, the articulated discharge end 10 is configured to be positioned at the discharge end of a first conveyor, such as an elevating conveyer 700, adjacent to (e.g. generally above) a moveable receiver, such as an intake hopper 710 of a boom conveyor 712. The boom conveyor is configured to pivot about two axes (i.e. swinging the distal end of the boom up or down and side-to-side) while product drops from the articulated discharge end 10 into the intake hopper 710.

Referring to FIGS. 1-6, the tip-down 10 generally includes a moveable frame 12, having a proximal end, indicated generally at 14, and a distal end, indicated generally at 16. The frame includes a transverse pivot member 18 at the proximal end 14, about which the frame can pivot to move the distal end 16 vertically. A longitudinal pivot member 20 is fixedly attached to and extends substantially perpendicularly from the transverse pivot member 18 toward the distal end 16. Because of its shape and configuration, the frame 12 is also referred to as a "T-frame." The proximal end 14 of the frame 12, including the transverse pivot member 18, is designed to be attached in a fixed position at the end of a conveyor device, such as an elevating conveyor. As the frame 12 pivots about the transverse pivot member 18, the distal end 16 of the tip-down frame will move up and down, as indicated by the arrow 22 in FIG. 5.

The frame 12 includes a fixed first transverse frame section 24 at the proximal end 14, and a plurality of independently moveable transverse frame sections 26 that are pivotally attached in series along the longitudinal pivot member 20 toward the distal end 16. The first transverse frame section 24 includes a fixed transverse frame member 28 with upstanding side panels 30 on each side, which help to retain product on the conveyor belt (1000 in FIG. 10). The transverse pivot member 18 extends between the side panels 30, and is substantially parallel to the fixed transverse frame member 28. The first transverse frame section 24 is the portion of the tip-down 10 that directly connects to the first conveyor device.

Attached to the first transverse frame section 24 and the articulating transverse frame sections 26 are a plurality of rollers 40 for rollably bearing a conveyor belt. A set of turn-around rollers 42 are also attached to the distal frame section 26a, at which the conveyor belt turns under the frame section and products on the belt can naturally drop off the end of the belt.

The moveable transverse frame sections 26 include a distal transverse frame section 26a, and any number of intermediate transverse frame sections 26b positioned between the distal transverse frame section and the first transverse frame section 24. Like the first transverse frame section 24, the moveable transverse frame sections 26 include upstanding side panels 32, attached to each opposing lateral side of the respective frame. These side panels 32 can be of flexible polymer material (e.g. PVC) and extend above the conveyor belt (720 in FIG. 10), so as to contain product borne by the conveyor belt.

Advantageously, the upstanding side panels 30, 32 of all of the transverse frame sections 24, 26 are placed side by side in a sliding plate arrangement, so that the arrangement of these side panels can adjust with movement of the tip-down. That is, as the tip-down pivots about the transverse pivot member 18 so that the distal end 16 moves up or down, the side plates 32 of the proximal intermediate pivoting transverse frame member 26b can slide against the side plates 30 of the fixed transverse frame member 24. Similarly, as can be seen by comparing the perspective views of FIGS. 1, 6 and 10, the side panels 32 of the pivoting transverse frame sections 26a, b can rotate away from each other with twisting of the tip-down frame about the longitudinal pivot member 20. This action is also facilitated by the flexible nature of the side panels 32.

Figure 4:
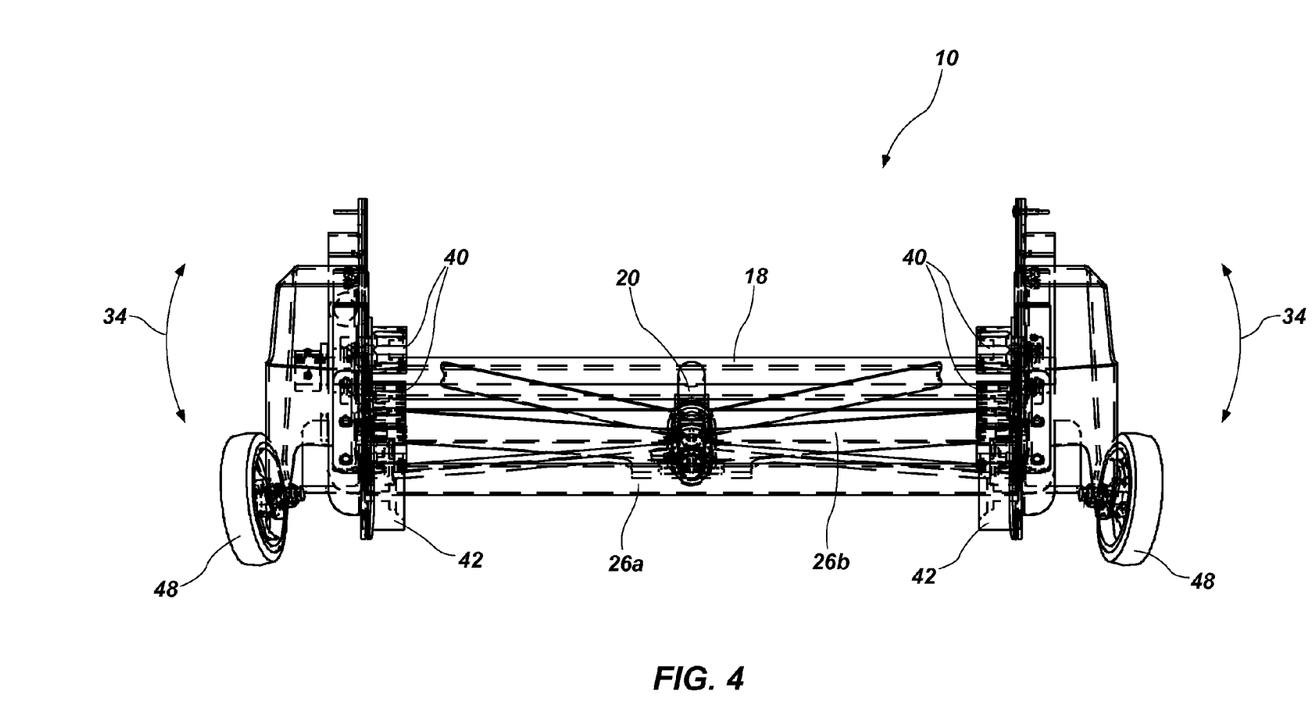
FIG. 4 is a front view of the articulated discharge end embodiment of FIG. 1.
Figure 6:
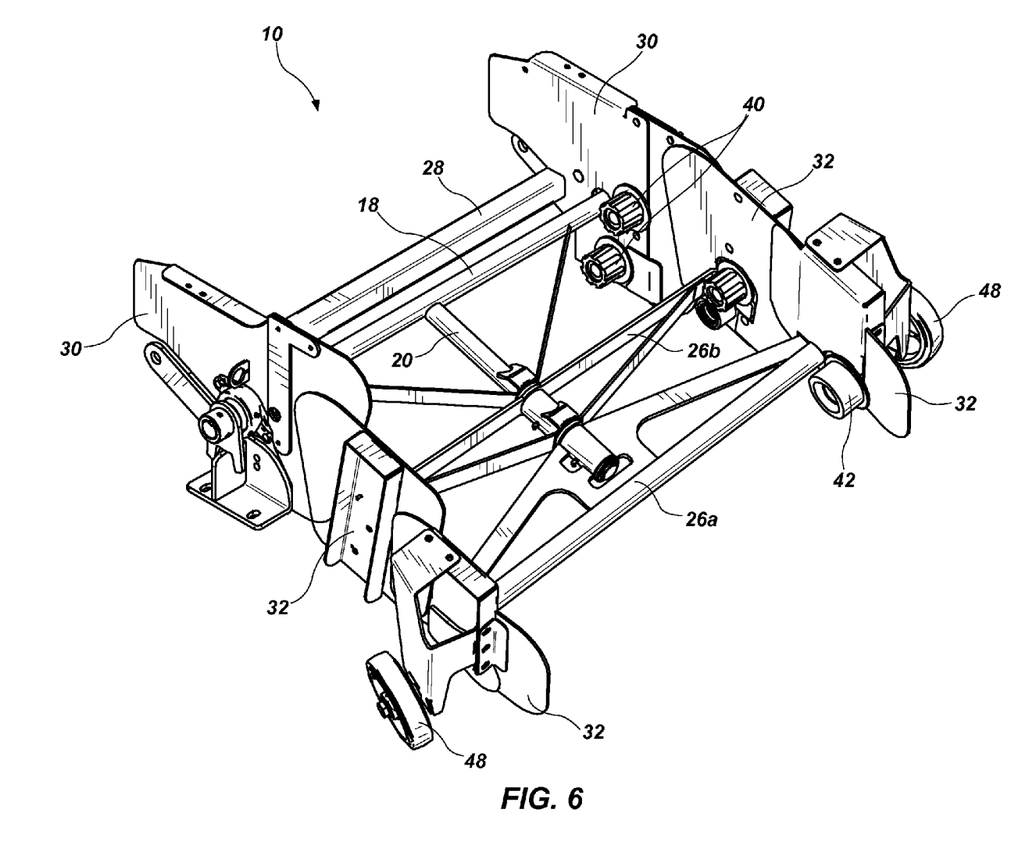
FIG. 6 is a front perspective view of the articulated discharge end embodiment of FIG. 1, showing the discharge end extended downwardly and axially twisted.
Figure 10:
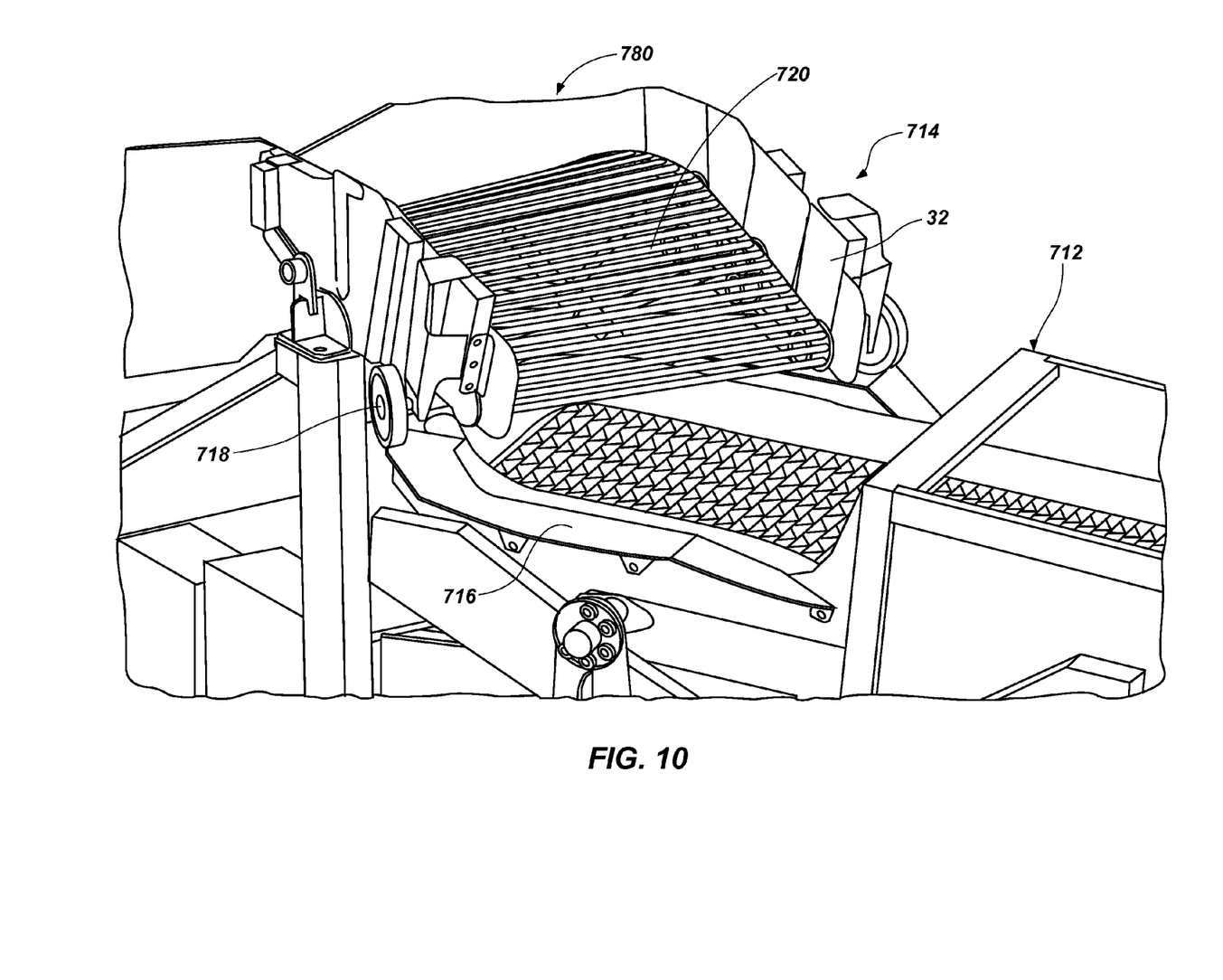
FIG. 10 is a front perspective view of an extended and twisted articulated discharge end configured with a conveyor belt for discharge into an adjacent boom hopper.

Unlike the first transverse frame section 24, which is fixed, the moveable transverse frame sections 26 can independently pivot or articulate with respect to each other along the longitudinal pivot member 20, allowing the distal end 16 of the frame to rotate or twist laterally (i.e. side-to-side with respect to the conveyor belt). Lateral twisting of the distal end of the tip-down is shown in FIGS. 4, 6 and 10, and indicated by arrows 34 in FIG. 4. Lateral twisting of the tip down and a chain-type belt 720 installed thereon is shown in FIG. 10. As can be seen from FIGS. 4 and 10, when the distal end 16 of the tip-down twists, the distal transverse pivoting frame 26a twists the greatest amount, with the intermediate transverse pivoting frame(s) 26b twisting some intermediate amount. This natural action of the articulated frame sections 26 results from their free pivoting configuration and the relative stiffness of the belt. It will be apparent that the length of the tip down and the number of pivoting sections, in combination with the relative stiffness of the belt, will govern the maximum possible degree of twisting of the tip-down.

Figure 1:
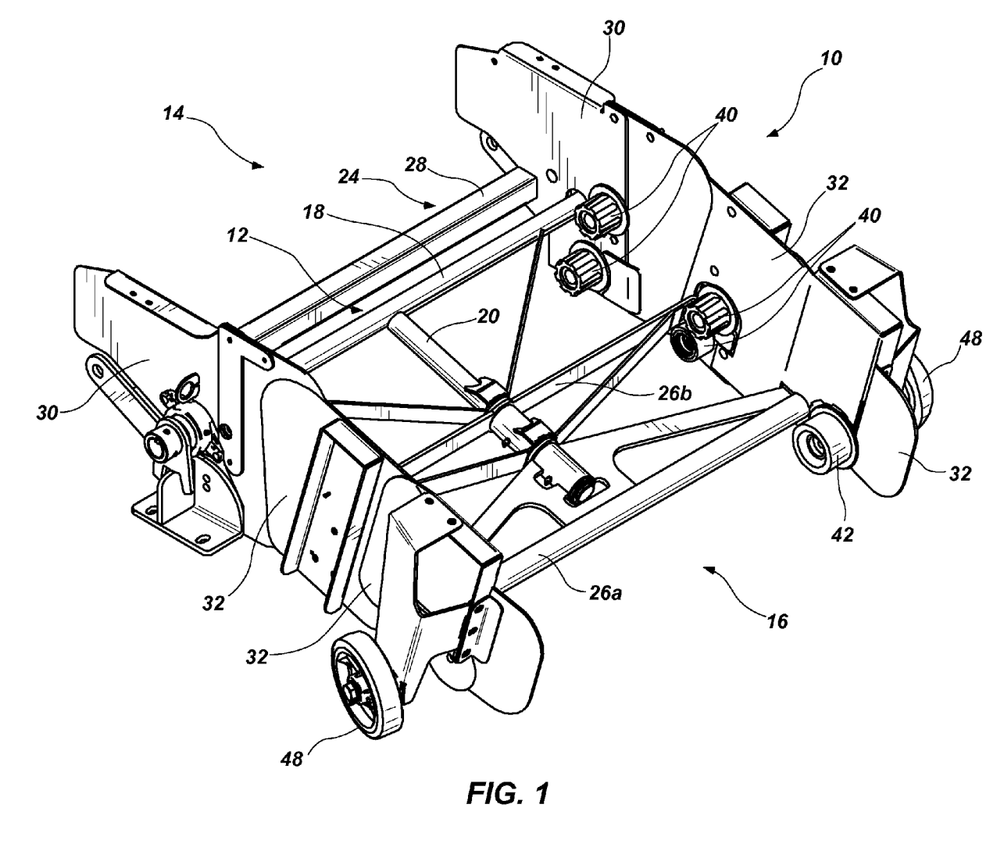
FIG. 1 is a perspective view of an embodiment of an articulated discharge end for a conveyor in accordance with the present disclosure.
Figure 2:
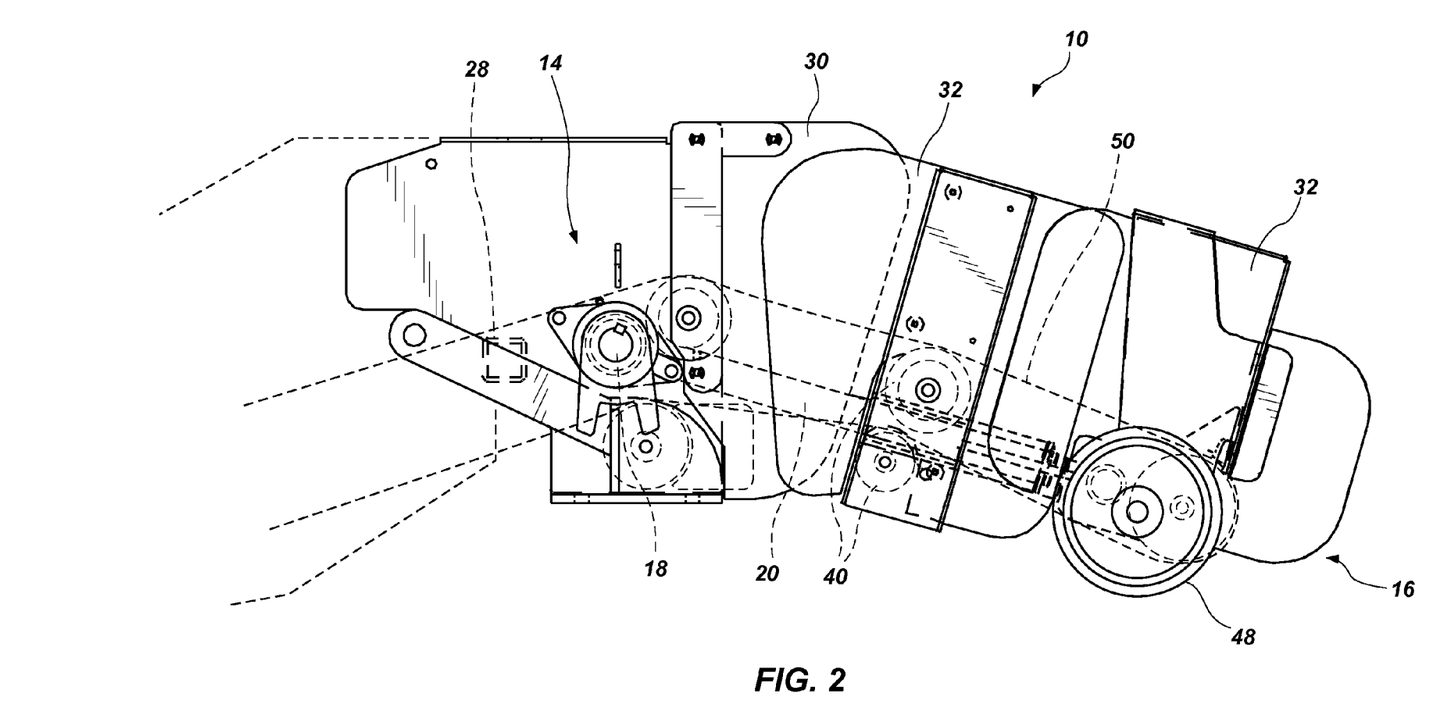
FIG. 2 is a side view of the articulated discharge end embodiment of FIG. 1.
Figure 5:
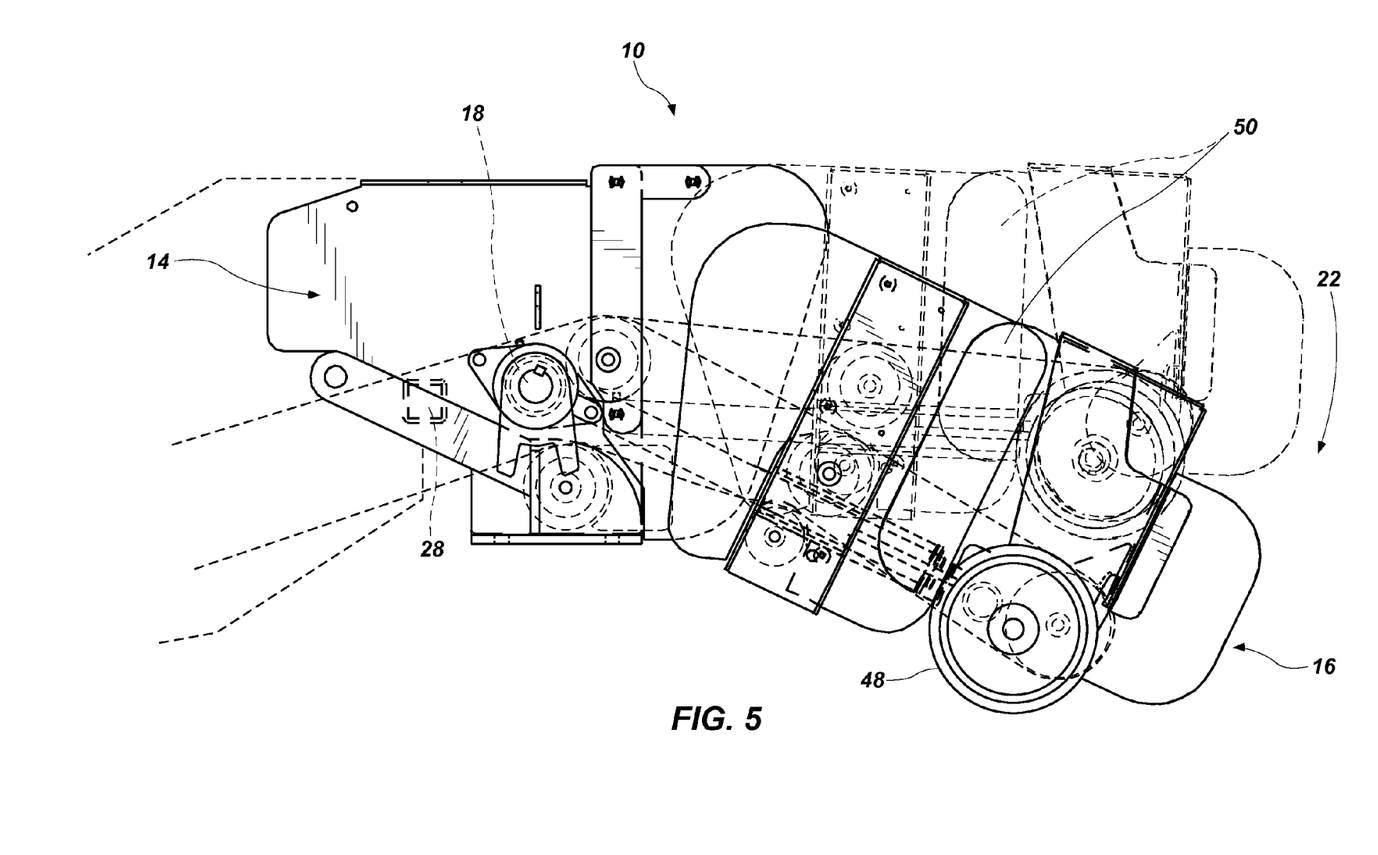
FIG. 5 is a side view of the articulated discharge end embodiment of FIG. 1, showing a possible range of longitudinal motion.

A variety of belt types and configurations can be used with the articulated discharge end disclosed herein. For example, a flat metal chain-type belt 720 can be used, as shown in FIG. 10. This type of belt is widely used for conveying potatoes. However, other types of belts can also be used, such as continuous rubber or polymer belts, belts comprising multiple relatively rigid polymer links, belts with cleats or other upstanding devices, belts that form a v-trough, etc. It is believed that essentially any type of belt can be used with this articulated discharge device. Those of skill in the art will recognize that the types of rollers used for supporting the conveyor belt can depend on the type of conveyor belt. The rollers 40, 42 shown in FIGS. 1, 3, 4 and 6 are relatively narrow discontinuous roller wheels positioned on opposing lateral sides of the tip-down frame, and are configured for use with a metal chain-type belt (e.g. belt 720 in FIG. 10) which can span between the discontinuous rollers. The path of a belt 50 relative to the tip down structure is shown in FIGS. 2 and 5. The path of a continuous elevator and tip down belt 720 is shown in FIGS. 7-10. Other types of belts can use other types of rollers for support. For example, a continuous rubber belt can use continuous rollers that span the frame of the elevator and the tip-down from side to side to support the belt across its width.

It is also to be understood that the belt of the articulated tip-down device can be a separate belt, or it can be continuous, forming a part of the adjacent conveyor. That is, the articulated tip-down disclosed herein can be configured as an integral part of an elevating conveyor or other type of conveyor, with a single continuous belt, as shown herein. This is the configuration shown in FIGS. 7-10, in which the elevator 700 and the tip down 714 both support a single continuous conveyor belt 720. Alternatively, the articulated tip-down can be a separate device, with its own discrete belt section, that can be configured to attach to the end of another conveyor device with its own separate belt, belt drive motor, etc. This latter case can be desirable for retrofitting an existing elevating conveyor with an articulated tip-down as disclosed herein.

The number of pivoting transverse frame sections 26 can vary. In the embodiment shown in FIGS. 1-6 there are two moveable transverse frame sections 26a, b, but other numbers of transverse frame sections can be used. It will be apparent that a larger number of pivotal transverse frame sections can be used to make the articulated tip-down more flexible, and the length of the tip down can be varied depending on the distance needed to obtain the full desired twisting of the belt.

With this configuration, the articulated tip-down has two axes of rotational motion. Specifically, the distal end 16 is both vertically translatable (via pivoting about the transverse pivot member at the proximal end) and laterally or axially rotatable (i.e. twistable via pivoting of the moveable transverse frame sections 26 about the longitudinal pivot member 20).

Extending from the distal end of the frame 12, e.g. from a lower part of the distal pivoting transverse frame section 26a, is a guide, such as guide wheels 48, configured to contact a moveable receiver device, such as the intake hopper 710 of the boom conveyor 712, as shown in FIGS. 7-10. The configuration of the guide can vary. While guide wheels 48 are shown in FIGS. 1-6, any mechanical member, such as an arm, bumper, roller, etc., that extends from the tip-down frame and contacts (e.g. sliding or rolling contact) the receiver device while it moves, while maintaining some clearance distance for the distal end of the conveyor belt, can be used as a guide. The clearance or drop distance, indicated as H in FIG. 7, can vary, and can be selected based upon factors such as the type of product being conveyed, the type of conveyor belt and the specific configuration of the elevating conveyor and boom conveyor. In one embodiment, the tip down and guide wheels 48 are configured to substantially maintain the distal end of the belt above the receiver a distance H of about one and a half times the diameter of a typical potato (e.g., around 4" or 5"). Other heights H can also be used.

In the embodiments shown herein, the intake hopper 710 of the boom conveyor 712 includes a generally circular upper surface or rim 716 (e.g. a flat ring that is welded to the top of the boom hopper 710), and the guide includes a pair of guide wheels 718, which are configured to ride on the rim 716 while the hopper moves due to motion of the boom 712. Because of this contact of the guide wheels upon the receiver, motion of the moveable receiver substantially governs the motion of the tip-down 714 about its two axes of rotation—i.e. vertical translation and lateral rotation or twisting. That is, the tip-down 714 essentially "floats" upon the upper rim 716 of the intake hopper, so that as the intake hopper moves when the boom swings up and down or side-to-side, the distal end of the tip-down tips and/or twists accordingly, so that the guide stays in contact with the hopper to maintain a substantially constant drop distance across the entire width of the belt.

Figure 3:
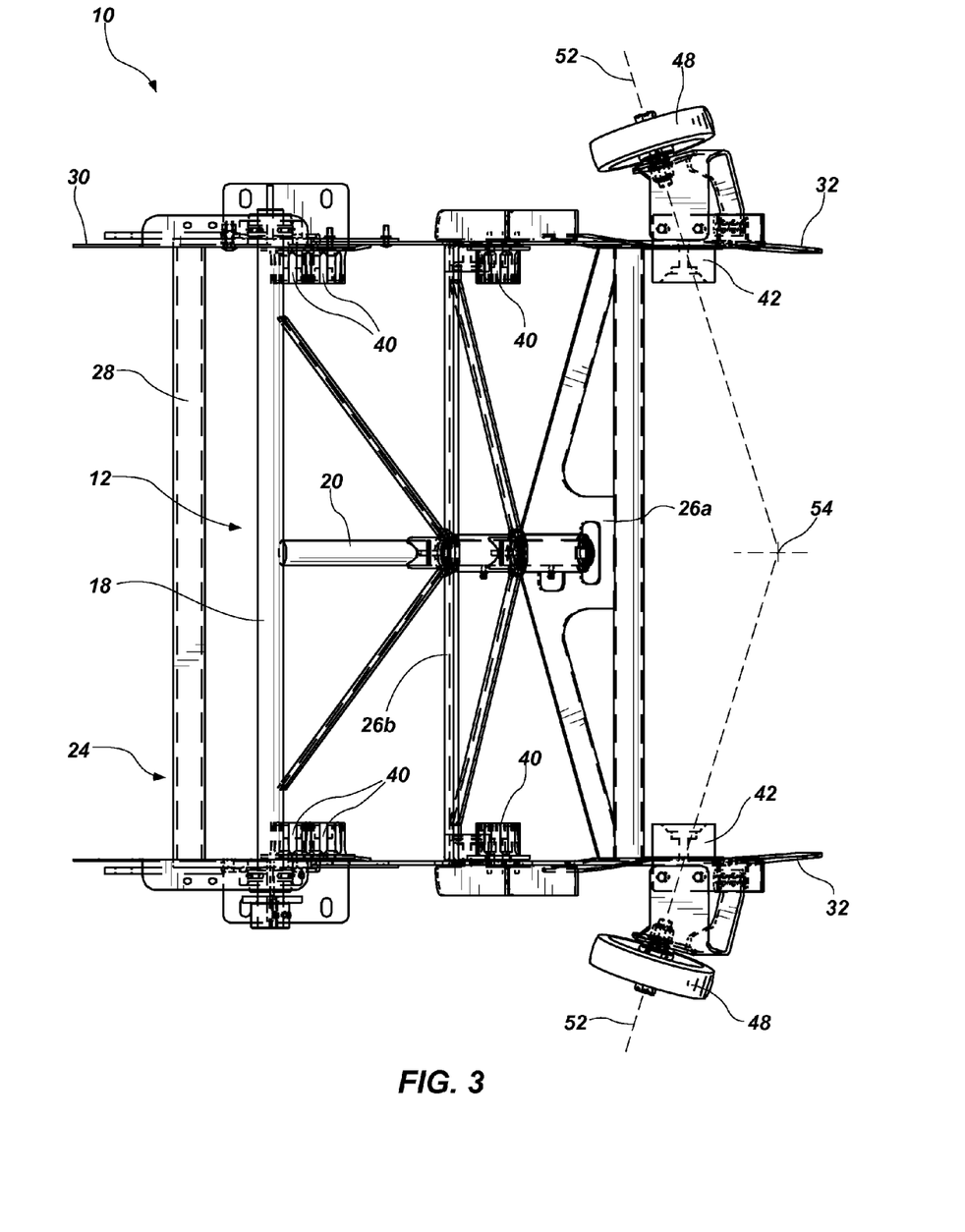
FIG. 3 is a top view of the articulated discharge end embodiment of FIG. 1.
Figure 7:
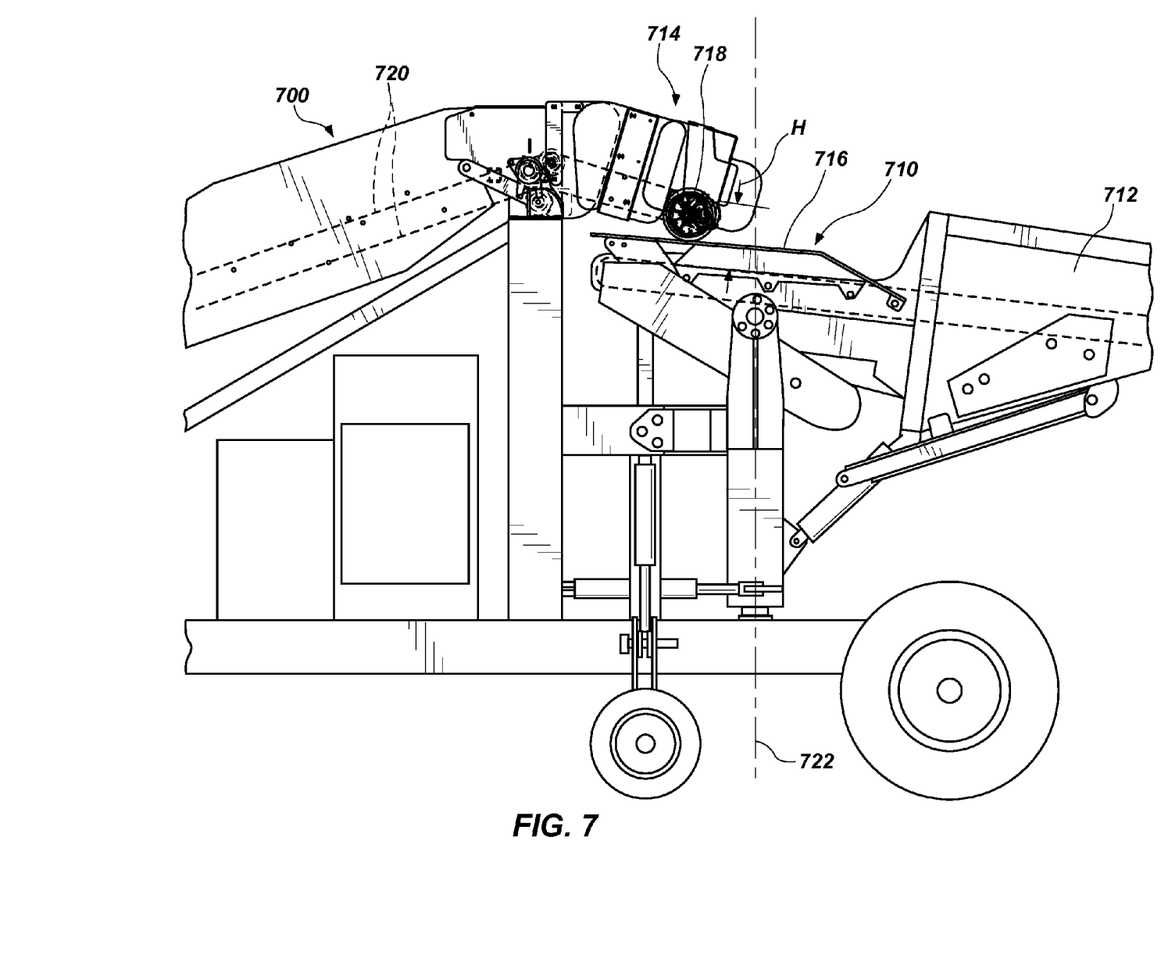
FIG. 7 is a side view of an embodiment of an articulated discharge end in accordance with the present disclosure positioned at the end of an elevator for discharge to the hopper of a boom, with the boom oriented down and straight relative to the longitudinal axis of the elevator and the discharge end.

As best seen in FIG. 3, the guide wheels 48 can be canted, having rotational axes 52 that are oriented substantially radially with respect to the center of rotation 54 of the receiver. In on embodiment, this can correspond to the central or pivoting axis 722 of the intake hopper 710, as shown in FIG. 7. In the embodiment shown in the figures, this axis 722 is the vertical pivoting axis of the boom conveyor 712, so that as the boom swings side-to-side, the upper surface or rim 716 of the intake hopper 710 rotates about its center 722 and the guide wheels roll with minimal friction atop the rim.

Figure 8:
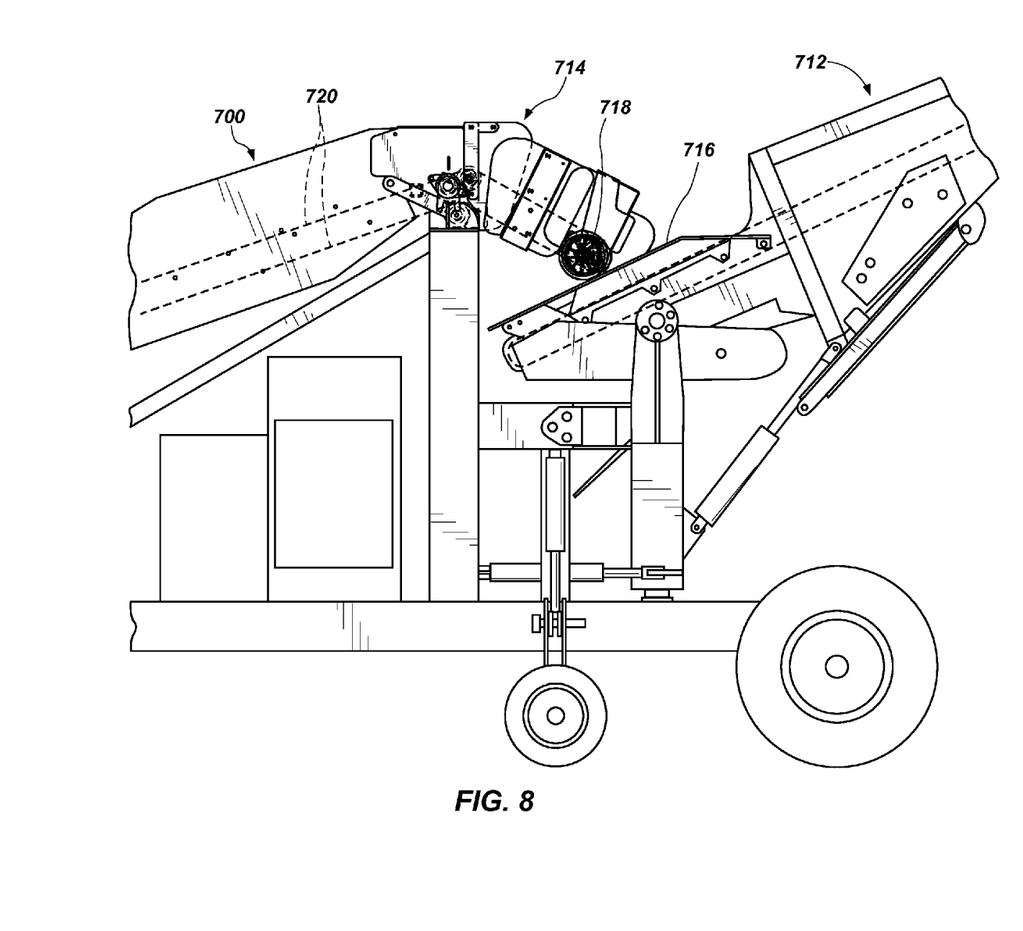
FIG. 8 is a side view of an embodiment of an articulated discharge end in accordance with the present disclosure positioned at the end of an elevator for discharge to the hopper of a boom, with the boom oriented upward and straight relative to the longitudinal axis of the elevator and the discharge end.
Figure 9:
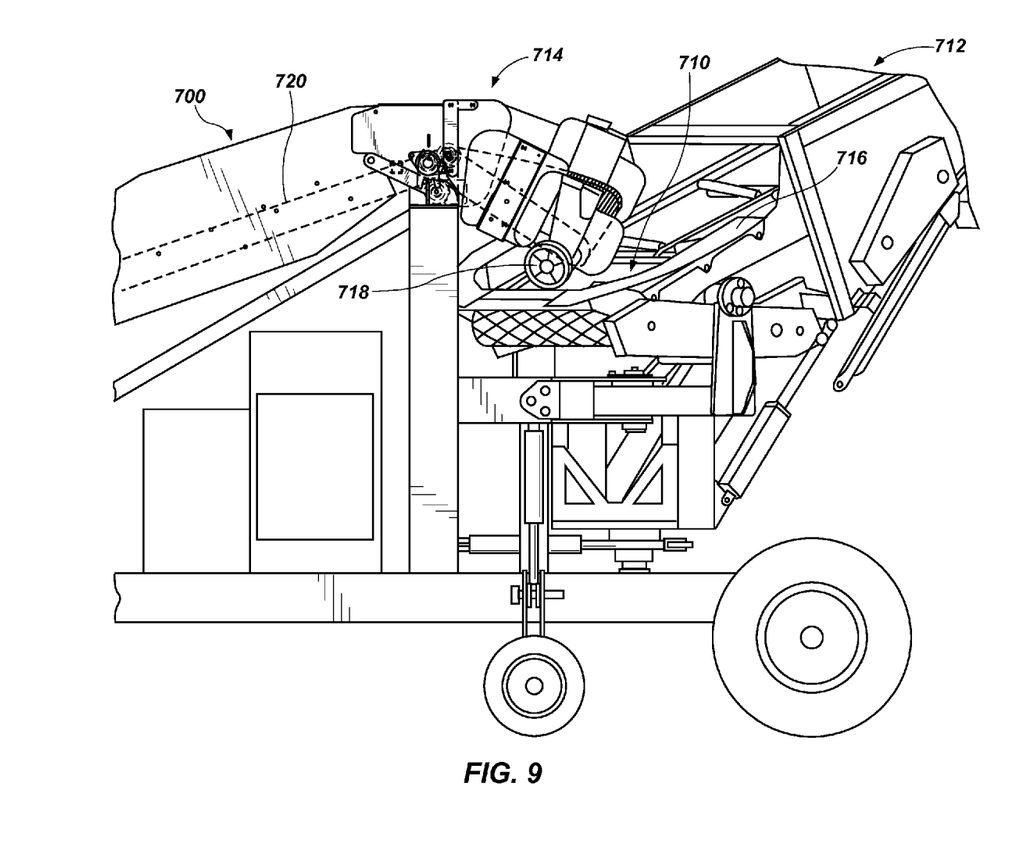
FIG. 9 is a side view of an embodiment of an articulated discharge end in accordance with the present disclosure positioned at the end of an elevator for discharge to the hopper of a boom, with the boom oriented upward and angled relative to the longitudinal axis of the elevator and the discharge end.

Various positions of the tip down 714 and boom 712 are shown in FIGS. 7-9. As the boom 712 rises up or down, the distal end 16 of the articulated tip down 714 pivots up or down, the guide wheels 718 maintaining the end of the belt at the desired height above the receiving hopper 710. This is shown in FIGS. 7 and 8. As the boom 712 swings side-to-side, the guide wheels 718 roll and support the tip-down 714 at the desired height regardless of the horizontal angle of the boom. As the boom both swings side-to-side and pivots up or down, the rollers 718 roll, the tip down 714 pivots up or down, and the pivoting transverse frame sections 26 pivot and twist about the longitudinal pivot member 20 (see FIGS. 1-6), and the discharge end of the belt, so that the drop distance remains substantially constant across the width of the belt, regardless of the orientation of the boom. A view of the boom 712 oriented upward and horizontally angled relative to the elevator and the articulated discharge end is shown in FIG. 9. In this sort of position, the tip-down 714 and belt 720 are both in a twisted configuration, which is depicted in FIG. 10.

The configuration depicted in FIG. 9 is the least desirable drop position for a piler with a conventional tip-down and boom hopper. With the boom 712 all the way up and swung to one side, this creates a situation where the drop is much greater on one side of the belt 716 than the other side. Advantageously, the articulated or "floating" tip-down (714 in FIG. 9) disclosed herein allows each side of the tip-down belt to stay nearly the same distance above the intake hopper 710 of the boom 712, regardless of the position of the boom. Because the articulated tip-down 714 has free movement up and down and rotates or twists along the axis of product flow, it can swing down and rotate along the axis of flow, so that the drop distance (H in FIG. 7) is minimized for essentially all positions of the boom 712, thus minimizing damage to the product. This allows the product to be delivered into the boom hopper at nearly the same height on either side of the belt.

It is to be understood that the articulated discharge design shown herein can be configured in different ways than those depicted in the figures. For example, the positions of the pivoting members of the tip-down can vary, such as having the longitudinal pivoting member (e.g. member 20 in FIGS. 1-6) positioned toward one lateral side of the tip down, rather than in the center. As another example, a tip down can be configured with multiple transverse pivoting members (e.g. member 18 in FIGS. 1-6), so that the tip-down can bend to change its horizontal angle in several increments, rather than with one abrupt bend. Other alternatives are also possible. For example, the tip down can be configured to rotate only, and not pivot down. Alternatively, the tip down can be configured to pivot down and not rotate. As another alternative, the tip down can be configured to pivot down in several discrete graduations, rather than within a generally continuous pivoting range, as shown in the figures. The device can also be used in a variety of situations, in addition to the application with an elevating conveyor and boom conveyor that is shown herein. This apparatus can be used to help minimize the drop that is created whenever it is necessary to feed product from one conveyor to another conveyor.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. An articulated discharge end for a conveyor, positionable adjacent to a moveable receiver, comprising:
   a frame, having a distal end, configured to bear a turnaround roller of a discharge end of a conveyor belt at the distal end, the distal end of the frame having two axes of rotation, whereby the distal end is vertically translatable and laterally rotatable; and
   a guide, disposed near the distal end, configured to contact the moveable receiver, whereby motion of the moveable receiver can substantially govern vertical translation and lateral rotation of the distal end.

2. An articulated discharge end in accordance with claim 1, wherein the frame is configured to pivot about a first axis to move the distal end up or down, and to twist about a second axis to raise or lower opposing lateral sides of the distal end.

3. An articulated discharge end in accordance with claim 2, wherein the frame further comprises:
   a transverse pivoting member, disposed along the first axis;
   a longitudinal member, affixed to and extending substantially perpendicularly from the first member toward the distal end; and
   a plurality of frame sections, independently pivotally attached in series along the longitudinal member.

4. An articulated discharge end in accordance with claim 3, wherein the plurality of frame sections include a distal frame section, the guide being attached to the distal frame section.

5. An articulated discharge end in accordance with claim 4, wherein the guide comprises a pair of guide wheels, positioned at a lower part of the distal frame section, configured to roll atop the receiver.

6. An articulated discharge end in accordance with claim 4, wherein the guide is configured to substantially maintain the distal end a distance of about 4" to 5" above the receiver.

7. An articulated discharge end in accordance with claim 3, wherein each of the plurality of frame sections comprise a transverse member having opposing lateral sides, and an upstanding side panel, attached to each opposing lateral side and extending above the conveyor belt, configured to contain product borne by the conveyor belt.

8. An articulated discharge end in accordance with claim 1, wherein the articulated discharge comprises a discharge end of an elevating conveyor, and the conveyor belt is a continuous belt of the elevating conveyor.

9. An articulated discharge end in accordance with claim 1, wherein the guide comprises a pair of guide wheels, positioned at a distal end of the frame, and configured to roll atop the receiver.

10. An articulated discharge end in accordance with claim 1, wherein the guide is configured to substantially maintain the distal end a distance of about 4" to 5" above the receiver across substantially an entire width of the distal end.

11. An articulated discharge end for an elevating conveyor having a continuous conveyor belt, comprising:
    a frame, having a distal end bearing a discharge end of the conveyor belt, the frame including
       a transverse pivot member, about which the frame can pivot to move the distal end vertically;
       a longitudinal pivot member, extending substantially perpendicularly from the transverse pivot member toward the distal end; and
       a plurality of independently moveable transverse frame sections, pivotally attached transversely in series along the longitudinal pivot member, pivoting of the transverse frame sections causing the distal end to rotate laterally; and
    a guide, extending from the frame, configured to contact a moveable receiver of a conveyor system, whereby motion of the moveable receiver substantially governs vertical motion and lateral rotation of the distal end.

12. An articulated discharge end in accordance with claim 11, wherein each of the plurality of transverse frame sections comprise a transverse member having opposing lateral ends, and an upstanding panel, attached to each lateral end and extending above the conveyor belt, configured to contain product borne by the conveyor belt.

13. An articulated discharge end in accordance with claim 11, wherein the articulated discharge end includes rollers configured to rollably support the discharge end of the conveyor belt, the conveyor belt being continuous a chain-type belt suitable for conveying potatoes.

14. An articulated discharge end in accordance with claim 11, wherein the guide comprises a pair of guide wheels, positioned at a distal end of the frame, and configured to roll atop the receiver.

15. An articulated discharge end in accordance with claim 11, wherein the guide is configured to substantially maintain the distal end a distance of about 4" to 5" above the receiver across substantially an entire width of the distal end.

16. A conveyor system, comprising:
    a boom conveyor, configured to pivot about two axes, having a receiving hopper with an upper surface;
    an elevating conveyor, having a conveyor belt having a discharge end generally above the receiving hopper; and an articulating frame at the discharge end of the elevating conveyor, the articulating frame comprising:
> a plurality of moveable frame members, having two axes of rotation, whereby the discharge end is vertically moveable and axially twistable; and
> a guide, configured to contact the moveable receiver, whereby motion of the discharge end about the two axes is substantially governed by motion of the receiving hopper.

17. A conveyor system in accordance with claim 16, wherein the articulating frame further comprises:
> a pivot member, oriented transverse to the conveyor belt, the frame configured to pivot about the pivot member to move the discharge end vertically;
> a longitudinal member, extending substantially perpendicularly from the pivot member toward the discharge end; and
> a plurality of independently moveable transverse frame sections, pivotally attached transversely in series along the longitudinal member between the pivot member and the discharge end, pivoting of the transverse frame sections upon the longitudinal member causing the discharge end to twist laterally.

18. A conveyor system in accordance with claim 17, wherein each of the plurality of transverse frame sections comprise an upstanding side panel, attached to opposing lateral ends of the respective transverse frame section, the side panels extending above the conveyor belt to contain product borne by the conveyor belt.

19. A conveyor system in accordance with claim 16, wherein the guide comprises a pair of guide wheels, positioned at a distal end of the frame, and configured to roll atop the receiving hopper.

20. A conveyor system in accordance with claim 16, wherein the guide is configured to substantially maintain the discharge end a distance of about 4" to 5" above the receiving hopper across substantially an entire width of the discharge end.

\* \* \* \* \*